(12) United States Patent
Brinkley et al.

(10) Patent No.: US 12,450,046 B2
(45) Date of Patent: Oct. 21, 2025

(54) SIGNED SWI CONTAINING SIGNED EXTENSIONS FOR DYNAMIC INSTALLATION

(71) Applicant: Arista Networks, Inc., Santa Clara, CA (US)

(72) Inventors: James Samuel Brinkley, Santa Clara, CA (US); Eudean Michael Sun, Santa Clara, CA (US); Baptiste Elie Franck Covolato, Vancouver (CA); Ethan Barnett Rahn, Santa Clara, CA (US); Julien André Alexis Gomes, Vancouver (CA)

(73) Assignee: Arista Networks, Inc., Santa Clara, CA (US)

(*) Notice: Subject to any disclaimer, the term of this patent is extended or adjusted under 35 U.S.C. 154(b) by 107 days.

(21) Appl. No.: 18/466,089

(22) Filed: Sep. 13, 2023

(65) Prior Publication Data
US 2025/0085950 A1 Mar. 13, 2025

(51) Int. Cl.
*G06F 8/61* (2018.01)

(52) U.S. Cl.
CPC ..................... *G06F 8/61* (2013.01)

(58) Field of Classification Search
CPC ............. G06F 8/61; G06F 8/63; G06F 21/572
See application file for complete search history.

(56) References Cited

U.S. PATENT DOCUMENTS

| | | | | |
|---|---|---|---|---|
| 8,438,564 | B2* | 5/2013 | Zhou | G06F 9/44557 718/1 |
| 8,463,873 | B2* | 6/2013 | Chen | G06F 8/63 709/219 |
| 8,949,613 | B1 | 2/2015 | Hackborn et al. | |
| 2020/0412548 | A1* | 12/2020 | Allen | G06F 8/658 |
| 2021/0240491 | A1* | 8/2021 | Downum | G06F 9/4406 |
| 2025/0045404 | A1* | 2/2025 | Griffin | G06F 21/602 |

OTHER PUBLICATIONS

European Search Report issued by the European Patent Office (EPO) for European Patent Application No. 24198631.4, mailed Feb. 11, 2025, 9 pages.

* cited by examiner

*Primary Examiner* — Marina Lee
(74) *Attorney, Agent, or Firm* — Sprinkle IP Law Group

(57) ABSTRACT

For dynamic installation of extensible network operating system (ENOS) extensions, a network device downloads a full software image (SWI) having a signature and a directory containing software packages from an install source. During downloading, the network device modifies the full SWI on the fly, including reading and removing the software packages (SWIX files) from the directory, as each one is read, determining whether to keep it, for each "keep" SWIX file, extracting an ENOS extension and a corresponding signature, and storing them on a nonvolatile memory, resulting in a modified SWI with a signature but without the SWIX files. After download is complete, the signed ENOS extensions stored on the nonvolatile memory are verified to determine valid ENOS extensions for inclusion in an overlay filesystem which becomes a root filesystem for the network device. The signed modified SWI is also verified before booting the network device into the modified SWI.

20 Claims, 3 Drawing Sheets

SIGNED SWI CONTAINING SIGNED EXTENSIONS FOR DYNAMIC INSTALLATION

TECHNICAL FIELD

This disclosure relates generally to operation system installation on computing devices. More particularly, this disclosure relates to dynamic installation of extensible network operating system extensions on computing devices.

BACKGROUND OF THE RELATED ART

Generally, operating system (OS) extensions work in the background to extend the functionality of a computer. Installing an OS extension usually requires one or more restarts of the computer.

Further, installing software applications on the computer often requires additional efforts on the part of an administrator. For instance, the administrator has to download a software package, install the software package under a path on disk, configure the content of the software package, and perhaps restart (or authorize the restart) the computer to complete the installation. The administrator may then delete the software package.

BRIEF DESCRIPTION OF DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
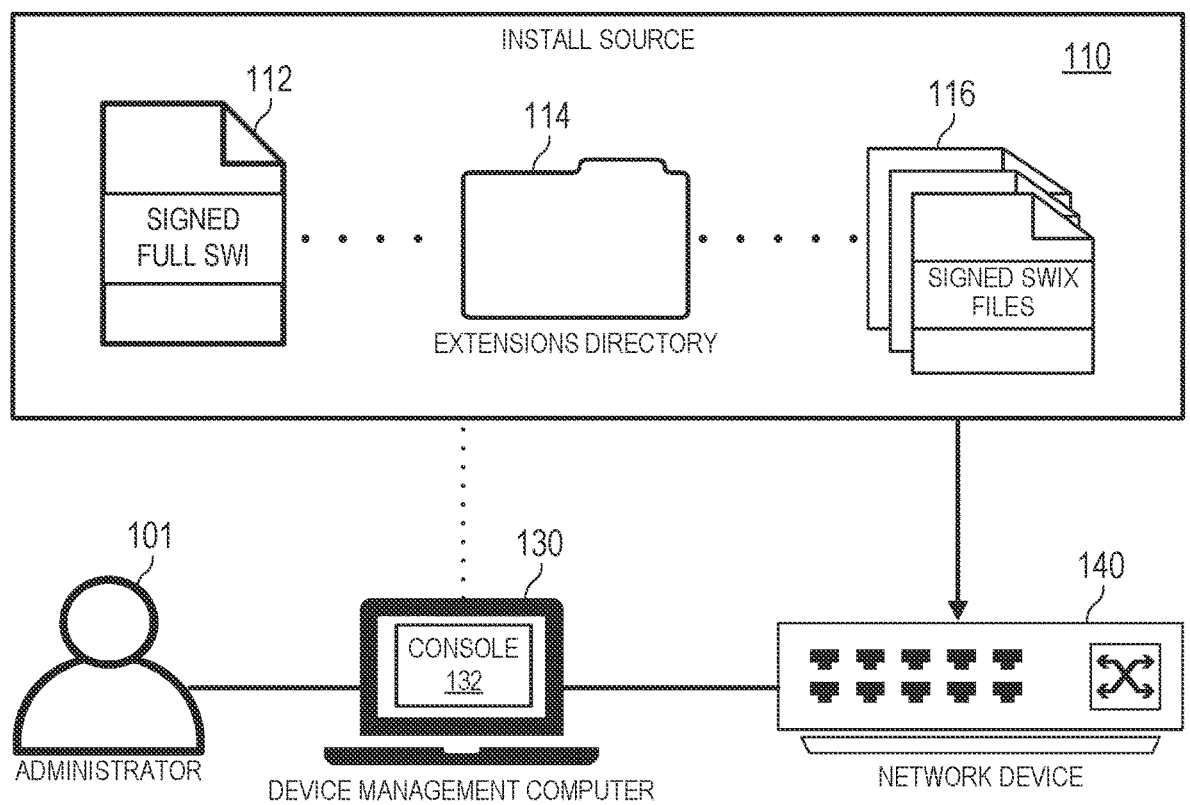
FIG. 1 depicts a diagrammatical representation of an example computing environment for dynamic installation of extensions according to some embodiments disclosed herein.

Specific embodiments will now be described with reference to the accompanying figures (FIGS). The figures and the following description describe certain embodiments by way of illustration only. One skilled in the art will readily recognize from the following description that alternative embodiments of the structures and methods illustrated herein may be employed without departing from the principles described herein. It is noted that wherever practicable similar or like reference numbers may be used in the figures and may indicate similar or like functionality.

Embodiments disclosed herein pertain to a type of fully programmable, highly modular, scalable Linux-based extensible network operating system (ENOS) for network devices such as switches, routers, access points, gateways, firewalls, etc. The ENOS is built on top of a Linux kernel that natively supports compiled applications packaged as Red Hat package managers (RPMs) files. RPMs are known to those skilled in the art and thus are not further described herein.

ENOS-enabled network devices are often installed by administrators, site managers, or other authorized users at remote sites (e.g., a customer-defined location or a branch office). As a non-limiting example, an administrator may enter an interactive command-line interface (CLI), such as the Aboot shell, to manually boot an ENOS-enabled switch. The ENOS-enabled switch has an internal nonvolatile memory (e.g., a flash storage) which contains an ENOS software image load file named "ENOS.swi" at a specified location from which the switch is booted. The administrator may manually enter installation commands or view/modify installation commands contained in a boot configuration file (e.g., a boot-config file) that is used during switch booting.

The installation commands can include a SWI command. The SWI command specifies the location and file name of the ENOS software image load file used for booting the switch. The ENOS software image load file may reside locally on the switch's internal flash drive (e.g., SWI=flash:ENOS.swi) or at a network address (e.g., SWI=http://foo.com/images/ENOS.swi). Other locations may also be possible (e.g., in the switch directory, on a USB drive, at a FTP path, at a TFTP path, at an NFS path, etc.).

The ENOS software image load file can contain proprietary software packages as well as third party software packages, allowing a variety of software applications to be installed and run on ENOS-enabled network devices to deliver workflow automation, high availability, network visibility and analytics, and rapid integration with a wide range of third-party applications for virtualization, management, automation and orchestration services.

However, there is a limit as to what can be packaged in the ENOS software image load file. This is because, while an ENOS-enabled network device is provided with a central processing unit (CPU), memory (e.g., a random access memory (RAM)), and nonvolatile storage (e.g., a flash drive), there is a limit to the number of features and services which may be enabled at one time. More usage requires more resources and ENOS-enabled network devices have upper limits on what can be used simultaneously.

For software packages which are desired, but are too large to be included in the ENOS software image load file, the ENOS supports a package format called SWIX (software image extension) for an administrator to find applications to load and install on the kernel, either during ENOS runtime or early on in boot-up. A SWIX is an archive file such as a zip file that includes one or more RPM files and one manifest.txt file. Any compression/decompression program can open the zip file to reveal the RPM files contained therein. A variety of ENOS extensions can be packaged into a SWIX and installed onto the ENOS. The SWIX can be packaged with a signature inside of the SWIX.

Currently, ENOS extensions are signed, published, and installed separately from the ENOS software image load file. As a non-limiting example, to install an extension on an ENOS-enabled network device, an administrator downloads a desired an extension (e.g., "sample_extension.swix") and copies it onto the internal storage (e.g., a flash drive) of the network device.

The administrator then copies the downloaded file from the internal storage to an extensions partition on the network device and installs the extension on the extensions partition on the network device using a CLI command (e.g., "switch #extension sample_extension.swix"). If extension persistence across reboots is required, the administrator is required to also copy the extension into the boot-extensions partition.

The administrator then runs the extension to verify that the extension is installed correctly.

As illustrated above, installing extensions onto ENOS-enabled network devices requires manual handling by administrators, including downloading the extensions, installing them under a path on disk, and then configuring them. This is a rather tedious and error-prone process, particularly for administrators who may have limited, if any, networking experience. Further, as alluded to above, due to installing RPM contents into the root filesystem in the ENOS, significant memory usage is unavoidable, which may impair the functionality of an ENOS-enabled network device on which the extension(s) is/are installed.

Accordingly, in some cases, it may be desirable to include ENOS extensions within the ENOS software image load file itself so that:

1) no additional steps are required to download and install a SWIX; and
2) the additional software packages do not have an up-front memory usage impact.

To achieve these objectives, the invention disclosed herein provides a new approach for dynamic installation of ENOS extensions on ENOS-enabled network devices. The new approach is realized through an enhanced software image, referred to herein as a "full SWI" at downloading time (e.g., a full "ENOS.swi"). The full SWI can be a zip file that contains a designated directory (e.g., "extensions") and two signatures.

The designated "extensions" directory stores ENOS extensions, packaged as compressed read-only filesystem files such as SquashFS files. In some embodiments, these compressed read-only filesystem files are unpacked, extracted, and parsed on the fly while the full SWI is being downloaded from an install source. Each compressed read-only filesystem file, which corresponds to a software package, is mounted in an overlay filesystem (e.g., OverlayFS) as read-only, allowing the software package to only be loaded into memory (e.g., RAM) as used or needed. OverlayFS is known to those skilled in the art and thus is not further described herein. The ENOS extensions thus obtained from the full SWI could take on different formats which, in turn, would be installed or loaded differently, depending on the internal file contents of a respective ENOS extension.

In some embodiments, the software upgrade CLI command "install source" is modified or otherwise updated so as to extract ENOS extensions from the full SWI during the download of the full SWI. Each ENOS extension thus extracted is discarded or kept on the nonvolatile memory, depending on the configuration settings specified by the administrator (or an authorized user). The administrator may connect to the install source and the network device through an administrator console on a network device management computer (e.g., a laptop, mobile device, etc.).

After the download process is complete, the resulting software image stored on the nonvolatile memory will not contain any ENOS extensions (as they have all been extracted from the "extensions" directory). However, it still contains a valid signature. All the ENOS extensions that have been extracted on the fly and stored on the nonvolatile memory will also have valid signatures. That is, the downloaded software image, even if it no longer contains any ENOS extensions, will have a matching valid signature which can be verified after having the ENOS extensions stripped from it. Further, any ENOS extensions thus extracted and stored will also have their own signatures which can be verified.

In this way, the invention enables an authorized user (e.g., an ENOS installer, an administrator, a site manager, etc.) to choose which ENOS extensions to install dynamically, without requiring downloading these ENOS extensions separately from the ENOS software image load file. Also, since the ENOS extensions are packaged in the full SWI as compressed read-only filesystem files, the contents of the ENOS extensions can be mounted in an OverlayFS, allowing loading of additional software packages as needed, with minimal RAM impact.

As illustrated in FIG. 1, an administrator 101 may access an administrator console 132 on a device management computer 130 connected to a network device 140 and direct the network device 140 to download a full SWI 112 from an install source 110. The full SWI, which can be a signed ENOS software image load file, contains a designated "extensions" directory 114 that stores software packages (e.g., SWIX files) containing signed ENOS extensions 116. The rest of the signed ENOS software image load file contains the boot configuration information necessary for booting the network device.

Figure 2:
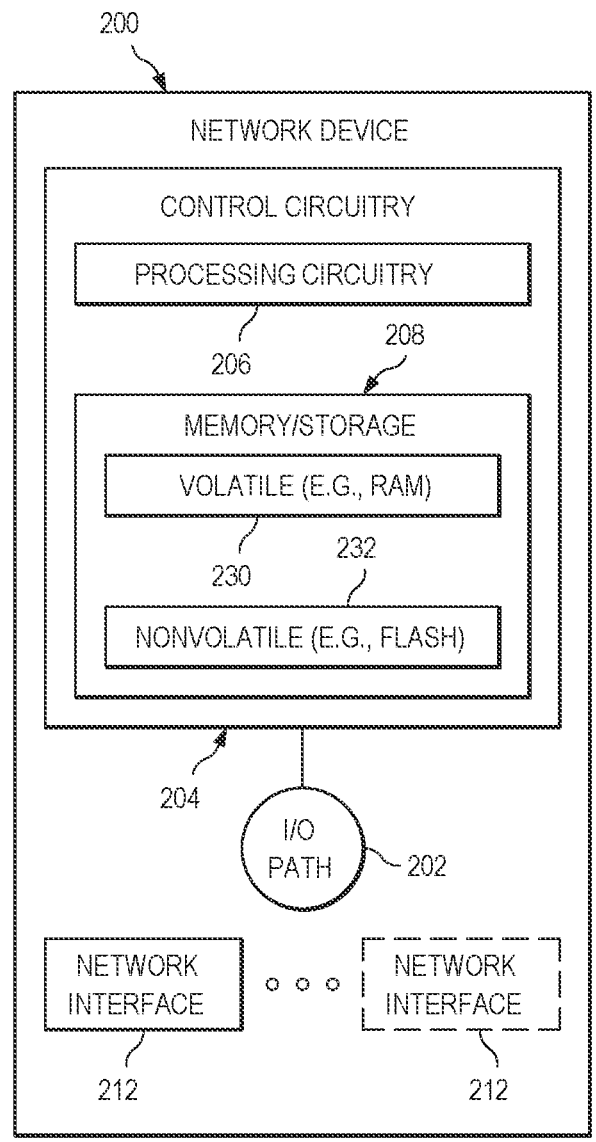
FIG. 2 depicts a diagrammatical representation of an example architecture of a network device according to some embodiments disclosed herein.

FIG. 2 depicts a diagrammatical representation of an example architecture of a network device 200 according to some embodiments disclosed herein. The network device 200 may receive data via an input/output (I/O) path 202. The I/O path 202 may provide packet data to a control circuitry 204, which includes a processing circuitry 206 and a storage (i.e., memory) 208. The control circuitry 204 may send and receive commands, requests, and other suitable data using the I/O path 202. In turn, the I/O path 202 may connect the control circuitry 204 (and specifically processing circuitry 206) to one or more network interfaces 212, to which other devices (e.g., the device management computer 130 shown in FIG. 1) can be connected. These network interfaces may be any type of network interface, such as an RJ45 ethernet port, a coaxial port, etc.

The control circuitry 204 can include the processing circuitry 206 and the storage 208. As referred to herein, the term "processing circuitry" should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores).

The processing circuitry 206 can be distributed across multiple separate processors or processing units, for example, multiple of the same type of processing units (e.g., two INTEL CORE i7 processors) or multiple different processors (e.g., an INTEL CORE i5 processor and an INTEL CORE i7 processor). The circuitry described herein may execute instructions included in software running on one or more general purpose or specialized processors.

The storage 208 can comprise an electronic storage device that includes a volatile RAM 230, which does not retain its contents when power is turned off, and a non-volatile RAM 232, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same. Other implementations may also be possible.

In some embodiments, a method for dynamic installation of ENOS extensions can include receiving, by a network device, a command or instruction to download a full software image (SWI) from an install source. The command or instruction can comprise a CLI command received from an administrator or authorized user through an administrator console on a device management computer communicatively connected to the network device. The full SWI can have a signature and a directory containing software packages for ENOS extensions. In some embodiments, the software packages can comprise software image extension (SWIX) files. Each SWIX file can contain a signature for validating a respective ENOS extension.

In some embodiments, while the full SWI is being downloaded from the install source to the nonvolatile memory of the network device, an adaptation tool on the network device can read header information from the full SWI and modify the full SWI on the fly. This modification can include individually reading and removing the software packages from the directory and, as each respective software package is read from the directory, determining whether to process the respective software package. The header information can include filenames and content lengths that can facilitate the adaptation tool to make this determination.

In some embodiments, as an individual software package is read from the directory, the adaptation tool can use a filename and content length contained in the header information to determine whether to process the individual software package based on a user-specified configuration setting. For instance, suppose the individual software package comprises a SWIX file and the user-specified configuration setting comprises a SWIX file name. The adaptation tool can determine whether to process the SWIX file based on whether the SWIX file has a file name that matches the SWIX file name specified in the user-specified configuration setting. If the SWIX file read from the directory of the full SWI is to be processed, the adaptation tool extracts an ENOS extension and a corresponding signature from the SWIX file and stores the ENOS extension with the corresponding signature on the nonvolatile memory.

In some embodiments, this on-the-fly modification results in a modified SWI that still has a signature like the full SWI, but that does not contain the software packages as all the software packages have been read/removed from the directory. The nonvolatile memory does not necessarily store all the software packages read/removed from the directory, unless they all have been indicated (e.g., per user-provided configuration settings) as being wanted. Rather, the nonvolatile memory may store a subset of the ENOS extensions with corresponding signatures extracted from the software packages.

In some embodiments, after download is complete, the subset of the ENOS extensions stored on the nonvolatile memory can be verified using the corresponding signatures so as to determine valid ENOS extensions for inclusion in an overlay filesystem which becomes a root filesystem for the network device. The signature of the modified SWI is also verified before booting the network device into the modified SWI. Such signature verifications can be performed by a boot loader on the network device before booting the network device into the modified SWI. Signature verification is known to those skilled in the art and thus is not further described herein.

Figure 3:
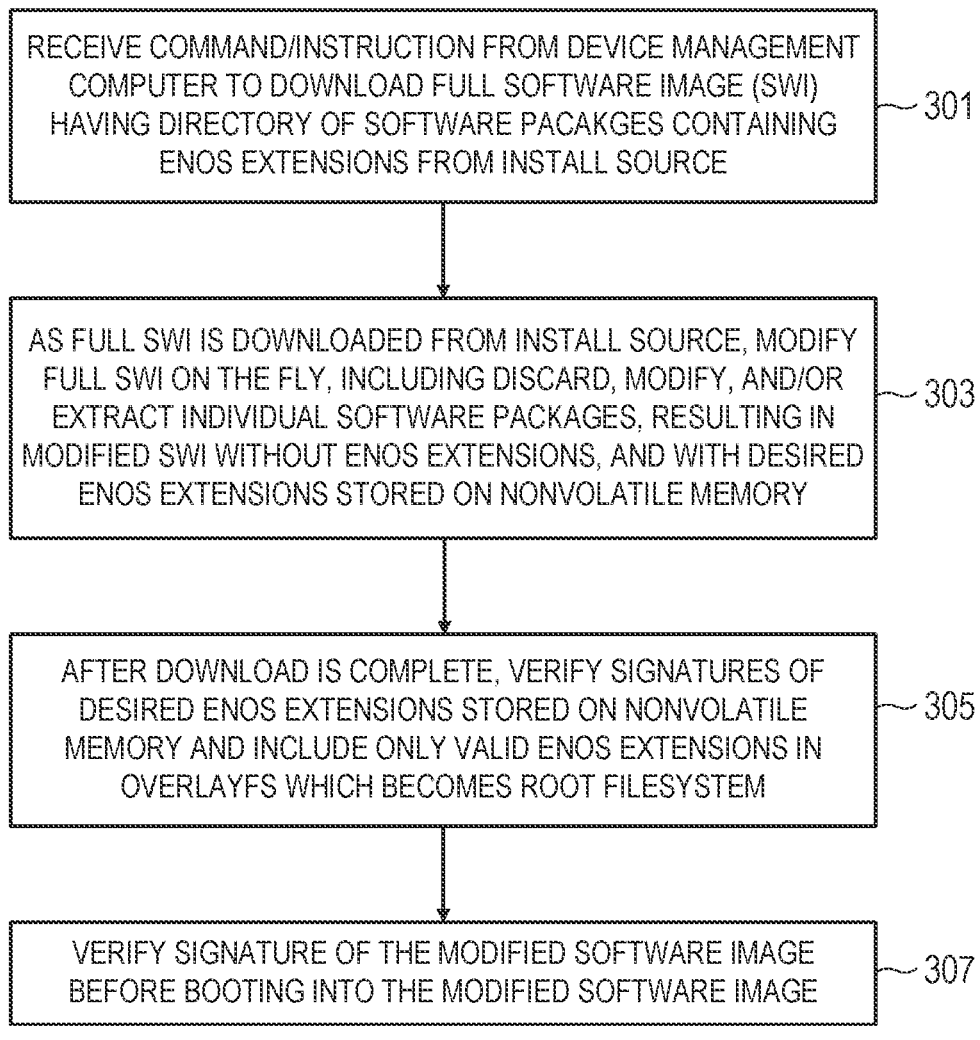
FIG. 3 is a flow chart that illustrates an example of a process for dynamic installation of extensions according to some embodiments disclosed herein.

FIG. 3 is a flow chart that illustrates an example of a process 300 for dynamic installation of ENOS extensions according to some embodiments disclosed herein. In some embodiments, at step 301, a network device (e.g., the network device 130 shown in FIG. 1) may receive a command or instruction (e.g., a CLI command which specifies an install source) from a device management computer (e.g., the device management computer 130 shown in FIG. 1) to download an ENOS software image load file containing desired ENOS extension(s) (e.g., the full SWI 112 shown in FIG. 1) from an install source (e.g., the install source 110 shown in FIG. 1). As discussed above, the full SWI includes, in addition to standard ENOS files for booting a network device, a designated directory that stores ENOS extensions packaged as compressed read-only filesystem files.

At step 303, as the full SWI is downloaded from the install source, the network device discards, modifies, and/or extracts individual software packages from the designated directory. As a non-limiting example, the "install source" CLI command can leverage a downloader, referred to herein as an adaptation tool, to modify the full SWI being downloaded "on-the-fly" by reading the zip archive header information from the full SWI and, while the full SWI is being downloaded from the install source, using filenames and content lengths contained in the header information of the full SWI to discard, modify, and extract files from the full SWI based on a user-provided configuration.

In this way, as the adaptation tool downloads the full SWI from the install source, all the software packages for the ENOS extensions (e.g., SWIX files) in the designated directory are read/removed from the full SWI and only those that have been specified (e.g., by an administrator) are stored on the nonvolatile memory of the network device. The ENOS extensions stored on the nonvolatile memory of the network device can be the same as, or a subset of, those contained in the designated directory. The adaptation tool discards the whole "extensions" directory from the full SWI, resulting in a modified SWI without any SWIX files. This modification avoids unnecessary disk usage by the SWIX files.

After download is complete, at step 305, signatures of the ENOS extensions stored on the nonvolatile memory of the network device are verified. Signature verification can be included in the early boot code such as "boot1", which will verify the signatures of the ENOS extensions stored on the nonvolatile memory of the network device and which will only include valid ENOS extensions into the OverlayFS (which becomes the root filesystem) if their respective signatures are valid.

At step 307, after having the ENOS extensions stripped from the full SWI, the resulting modified SWI still has a signature that can be verified (e.g., by Aboot) with a user-provided root certificate before booting the network device into the software image (i.e., the modified SWI).

The invention provides an enhanced ENOS software image load file which can have extension files stripped from it, while allowing those stripped extensions to keep valid signatures for signature verification during booting. Additionally, the enhanced ENOS software image load file itself has a valid signature even after having those extension files stripped from it.

The invention disclosed herein could be broadly adopted to meet special-case requirements or to provide additional "add-on" features such as large FPGA files or hefty software packages. Users of this invention would be those who desire to use extra software packages, which normally would not be installed by default in the standard ENOS software image load file due to the impact that it will have on the flash memory or RAM usage. As an example, suppose docker features are made available for ENOS.swi, which has a 100 MB flash impact with the ENOS.swi's existing SquashFS files, and which has a 400 MB RAM impact up-front just to install a docker file (e.g., "docker.x86_64.swix") in a zipped up RPM format into the root filesystem. The invention disclosed herein allows for administrators and authorized users alike to choose whether they want the docker file (which contains everything needed to run an application) installed prior to downloading the ENOS software image load file, and if the docker file is wanted, the up-front RAM usage of 400 MB can be avoided by downloading an enhanced ENOS software image load file and dynamically installing the desired ENOS extension(s) from a directory of the enhanced ENOS software image load file.

In this disclosure, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for dynamic installation of extensible network operating system (ENOS) extensions, the method comprising:
   receiving, by a network device, a command to download a full software image (SWI) from an install source, the full SWI having a signature and a directory containing software packages for ENOS extensions, the network device having a nonvolatile memory;
   while the full SWI is being downloaded from the install source to the nonvolatile memory, modifying, by the network device, the full SWI on the fly, the modifying comprising:
      reading and removing the software packages from the directory;
      as each respective software package is read from the directory, determining whether to process the respective software package; and
      for each respective software package that is to be processed:
         extracting an ENOS extension and a corresponding signature from the respective software package; and
         storing the ENOS extension with the corresponding signature on the nonvolatile memory;
      wherein the modifying results in a modified SWI containing the signature without the software packages; and
      wherein, after download is complete, the nonvolatile memory stores a subset of the ENOS extensions with corresponding signatures;
   verifying, by the network device using the corresponding signatures, the subset of the ENOS extensions so as to determine valid ENOS extensions for inclusion in an overlay filesystem which becomes a root filesystem for the network device; and
   verifying, by the network device, the signature of the modified SWI before booting the network device into the modified SWI.

2. The method according to claim 1, wherein the command comprises a command line interface (CLI) command received from an administrator console on a device management computer communicatively connected to the network device.

3. The method according to claim 1, wherein the software packages comprise software image extension (SWIX) files and wherein each SWIX file contains a signature for validating a respective ENOS extension.

4. The method according to claim 1, wherein the network device further comprises a boot loader and wherein the signature of the modified SWI is verified by the boot loader before booting the network device into the modified SWI.

5. The method according to claim 1, further comprising:
   reading header information from the full SWI, the header information comprising a filename and content length; and
   as an individual software package is read from the directory, using the filename and content length to determine whether to process the individual software package.

6. The method according to claim 5, wherein the network device further comprises an adaptation tool and wherein whether to process the individual software package is determined by the adaptation tool based on a user-specified configuration setting.

7. The method according to claim 6, wherein the individual software package comprises a software image extension (SWIX) file, wherein the user-specified configuration setting comprises a SWIX file name, and wherein whether to process the SWIX file is determined based on whether the SWIX file has a file name that matches the SWIX file name.

8. A network device, comprising:
a processor;
a nonvolatile memory; and
instructions stored on the nonvolatile memory and translatable by the processor for:
  receiving a command to download a full software image (SWI) from an install source, the full SWI having a signature and a directory containing software packages for extensible network operating system (ENOS) extensions;
  while the full SWI is being downloaded from the install source to the nonvolatile memory, modifying the full SWI on the fly, the modifying comprising:
    reading and removing the software packages from the directory;
    as each respective software package is read from the directory, determining whether to process the respective software package; and
    for each respective software package that is to be processed:
      extracting an ENOS extension and a corresponding signature from the respective software package; and
      storing the ENOS extension with the corresponding signature on the nonvolatile memory;
    wherein the modifying results in a modified SWI containing the signature without the software packages; and
    wherein, after download is complete, the nonvolatile memory stores a subset of the ENOS extensions with corresponding signatures;
  verifying, using the corresponding signatures, the subset of the ENOS extensions so as to determine valid ENOS extensions for inclusion in an overlay filesystem which becomes a root filesystem for the network device; and
  verifying the signature of the modified SWI before booting the network device into the modified SWI.

9. The network device of claim 8, wherein the command comprises a command line interface (CLI) command received from an administrator console on a device management computer communicatively connected to the network device.

10. The network device of claim 8, wherein the software packages comprise software image extension (SWIX) files and wherein each SWIX file contains a signature for validating a respective ENOS extension.

11. The network device of claim 8, wherein the network device further comprises a boot loader and wherein the signature of the modified SWI is verified by the boot loader before booting the network device into the modified SWI.

12. The network device of claim 8, wherein the instructions are further translatable by the processor for:
  reading header information from the full SWI, the header information comprising a filename and content length; and
  as an individual software package is read from the directory, using the filename and content length to determine whether to process the individual software package.

13. The network device of claim 12, wherein the instructions are further translatable by the processor for determining whether to process the individual software package based on a user-specified configuration setting.

14. The network device of claim 13, wherein the individual software package comprises a software image extension (SWIX) file, wherein the user-specified configuration setting comprises a SWIX file name, and wherein whether to process the SWIX file is determined based on whether the SWIX file has a file name that matches the SWIX file name.

15. A computer program product comprising a non-transitory computer-readable medium storing instructions translatable by a processor of a network device for:
  receiving a command to download a full software image (SWI) from an install source, the full SWI having a signature and a directory containing software packages for extensible network operating system (ENOS) extensions, the network device having a nonvolatile memory;
  while the full SWI is being downloaded from the install source to the nonvolatile memory, modifying the full SWI on the fly, the modifying comprising:
    reading and removing the software packages from the directory;
    as each respective software package is read from the directory, determining whether to process the respective software package; and
    for each respective software package that is to be processed:
      extracting an ENOS extension and a corresponding signature from the respective software package; and
      storing the ENOS extension with the corresponding signature on the nonvolatile memory;
    wherein the modifying results in a modified SWI containing the signature without the software packages; and
    wherein, after download is complete, the nonvolatile memory stores a subset of the ENOS extensions with corresponding signatures;
  verifying, using the corresponding signatures, the subset of the ENOS extensions so as to determine valid ENOS extensions for inclusion in an overlay filesystem which becomes a root filesystem for the network device; and
  verifying the signature of the modified SWI before booting the network device into the modified SWI.

16. The computer program product of claim 15, wherein the command comprises a command line interface (CLI) command received from an administrator console on a device management computer communicatively connected to the network device.

17. The computer program product of claim 15, wherein the software packages comprise software image extension (SWIX) files and wherein each SWIX file contains a signature for validating a respective ENOS extension.

18. The computer program product of claim 15, wherein the network device further comprises a boot loader and wherein the signature of the modified SWI is verified by the boot loader before booting the network device into the modified SWI.

19. The computer program product of claim 15, wherein the instructions are further translatable by the processor for:
  reading header information from the full SWI, the header information comprising a filename and content length; and
  as an individual software package is read from the directory, using the filename and content length to determine whether to process the individual software package.

20. The computer program product of claim 19, wherein the instructions are further translatable by the processor for determining whether to process the individual software package based on a user-specified configuration setting, wherein the individual software package comprises a software image extension (SWIX) file, wherein the user-specified configuration setting comprises a SWIX file name, and wherein whether to process the SWIX file is determined based on whether the SWIX file has a file name that matches the SWIX file name.

\* \* \* \* \*